No. 837,518. PATENTED DEC. 4, 1906.
J. C. TOBIAS.
GRAIN ELEVATOR.
APPLICATION FILED SEPT. 5, 1905.
5 SHEETS—SHEET 4.
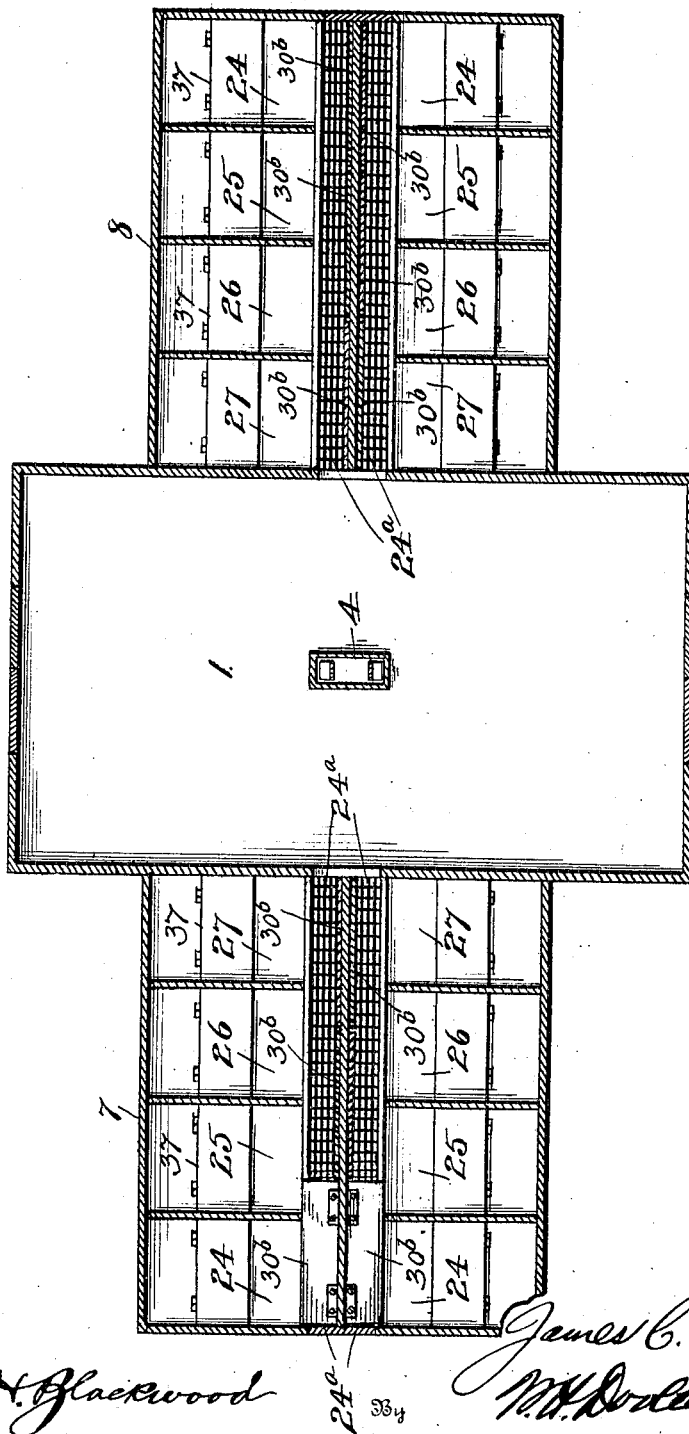

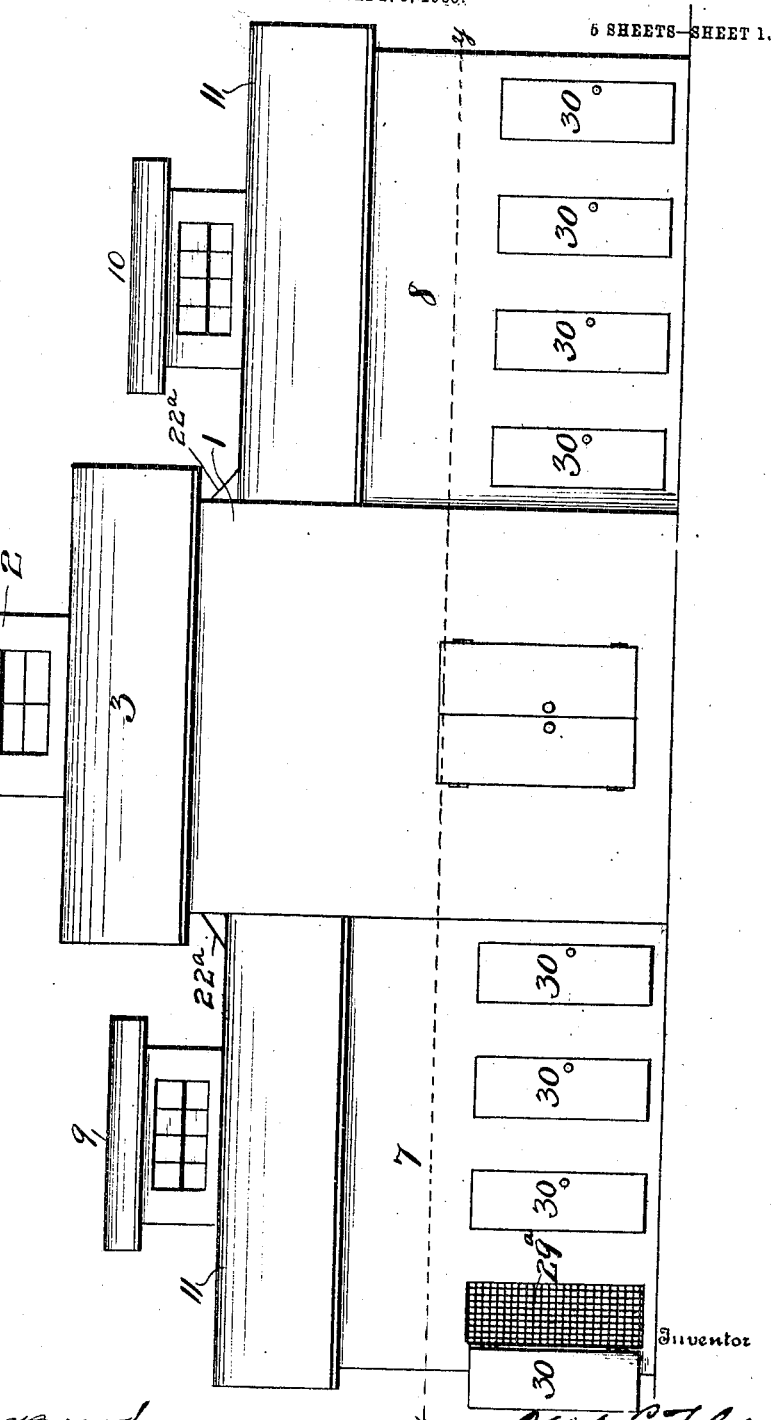

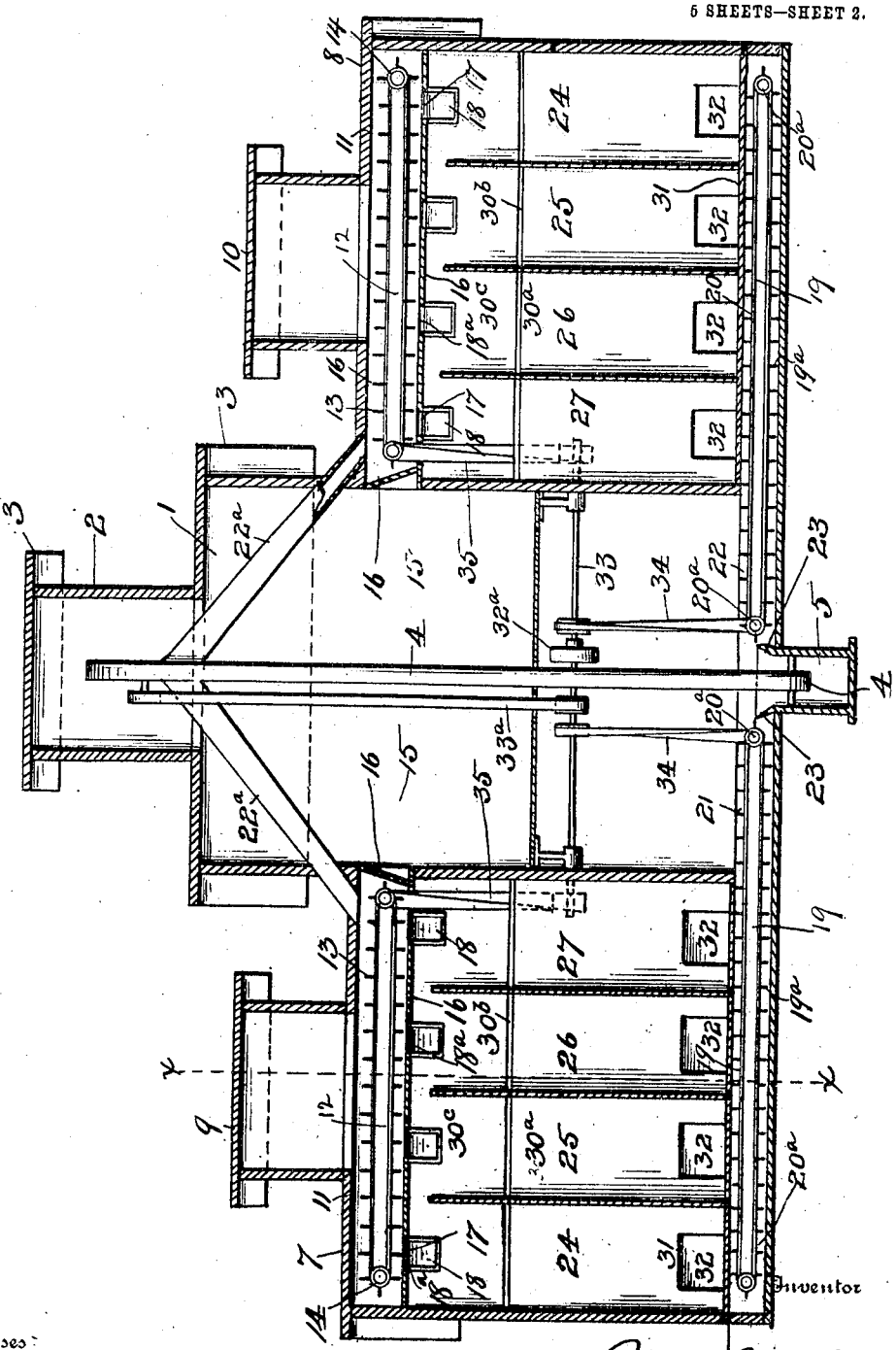

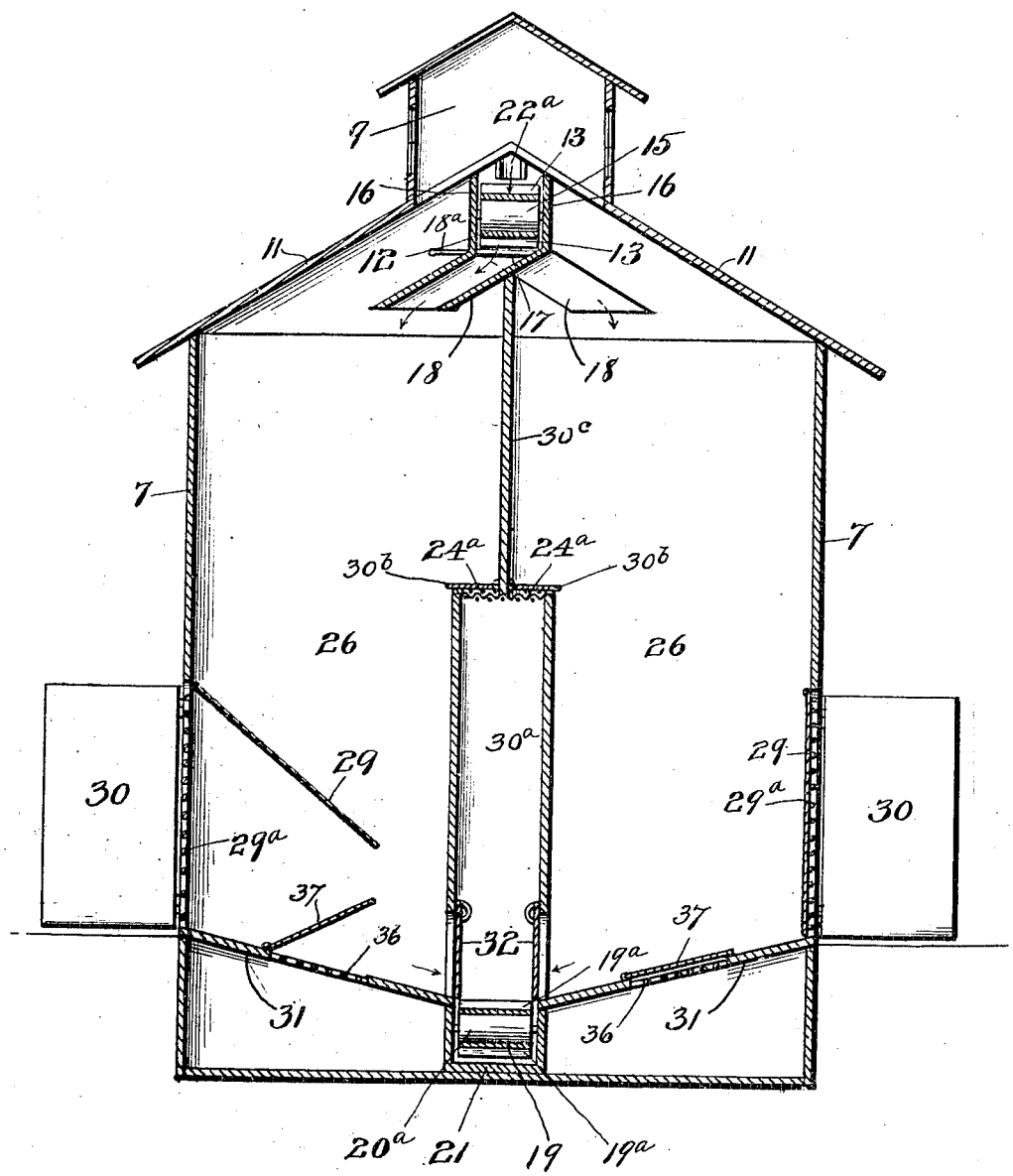

No. 837,518. PATENTED DEC. 4, 1906.
J. C. TOBIAS.
GRAIN ELEVATOR.
APPLICATION FILED SEPT. 5, 1905.
5 SHEETS—SHEET 5.
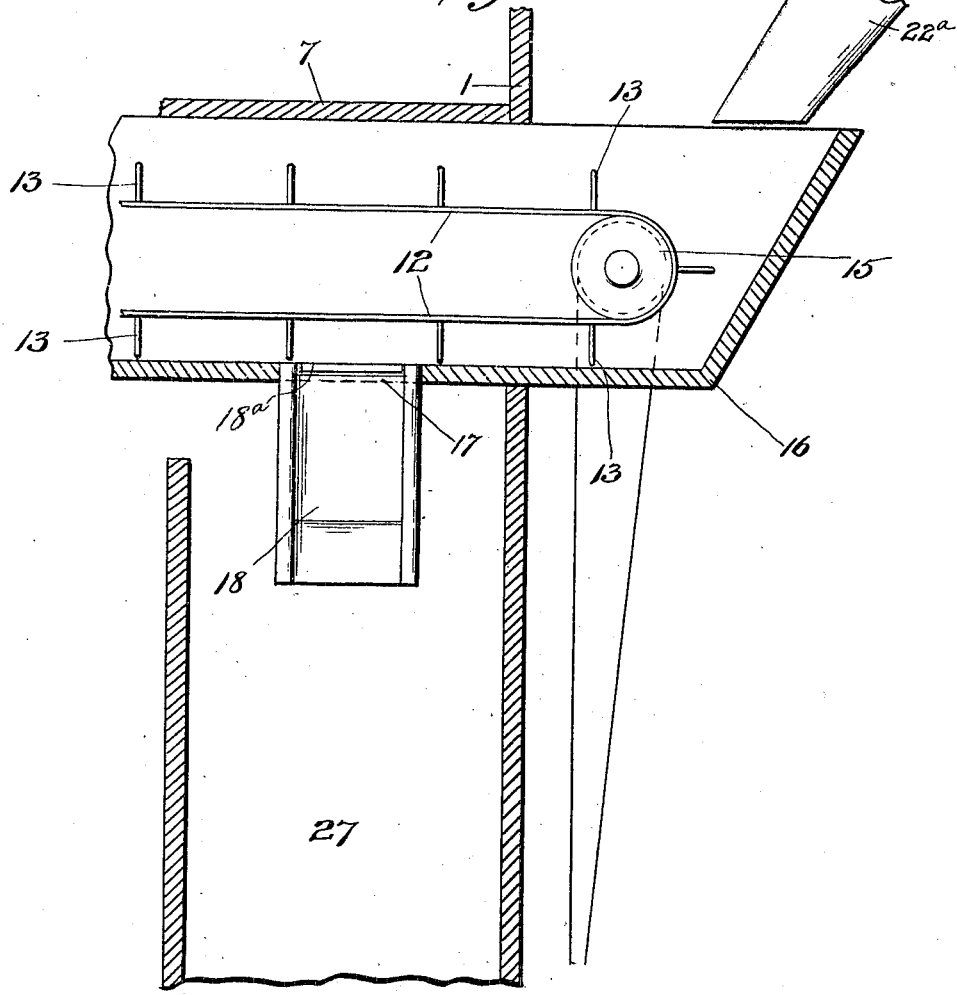
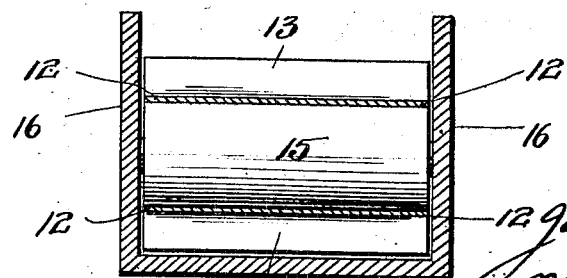

UNITED STATES PATENT OFFICE.

JAMES C. TOBIAS, OF BUCYRUS, OHIO.

GRAIN-ELEVATOR.

No. 837,518.   Specification of Letters Patent.   Patented Dec. 4, 1906.

Application filed September 5, 1905. Serial No. 277,109.

*To all whom it may concern:*

Be it known that I, JAMES C. TOBIAS, a citizen of the United States, residing at Bucyrus, in the county of Crawford and State of Ohio, have invented new and useful Improvements in Grain-Elevators, of which the following is a specification.

My invention relates to improvements in the construction of buildings for storing and transferring grain, commonly termed "elevator-buildings."

It consists in the several features and combination of features, as more fully hereinafter described and claimed.

The object of my invention is to economize space and save timber in constructing a building by providing wings on each side of the middle portion and storing grain in said wings, which can be used for small grain as well as corn on the ear, to provide means for the perfect ventilation throughout said building and bins, and to create a current of air from the bottom, center, and sides of the building up through the shelled corn and corn on the ear when such substances are used to the roof and thence out through a small cupola or other opening.

It further has for its object to so arrange the bins in connection with suitable elevators or conveyers that grain can be easily transferred to and stored in said bins, transferred from one bin to another, and delivered from any one or all of said bins to wagons, cars, vessels, or other receivers.

In the drawings, Figure 1 is a side elevation of my elevator-building. Fig. 2 is a longitudinal section. Fig. 3 is a cross-section on line $x$ $x$ of Fig. 2 on an enlarged scale. Fig. 4 is a horizontal section on line $y$ $y$ of Fig. 1. Figs. 5 and 6 are detail views.

Referring to the drawings, in which like numerals of reference designate like parts, 1 represents the central portion of the elevator-building provided with top 2, smaller in size than the said central portion and both preferably having slanting roofs 3.

At approximately the center of the central portion 1 an endless conveyer 4 is provided for elevating the grain from a boot 5, preferably situated below the lower floor, to the upper portion of said central portion.

Wings 7 and 8, having cupolas 9 and 10, are provided at opposite sides of the central portion 1; the tops or roofs 11 of said wings being a little less in height than the central portion 1, and each of said wings is provided at its upper central portion with an endless conveyer belt or chain 12, having push-plates 13 at intervals, said belt running over pulleys 14 and 15 at each end of each wing and through a conveyer-trough 16, which is provided with openings 17 and inclined spouts 18. The lower portions of each of said wings 7 and 8 are provided with longitudinally-extending conveyers 19 and 20, respectively, having push-plates 19$^a$, said conveyers running over pulleys 20$^a$ and designed to deliver grain to the boot 5, and 21 and 22 are troughs through which said belts 19 and 20 run. The troughs 21 and 22 are each provided with a suitable chute 23 at one end, designed to deliver grain to the boot 5 which has been fed from the several bins to the endless conveyers, from which boot it is loaded by any suitable means to a car, wagon, or other receptacle.

A series of storage-bins 24, 25, 26, and 27 are provided in each side of the wings 7 and 8, and these are divided according to the length of the wings which are designed to receive grain from the several spouts 18 of the conveyer-trough.

Pipes 22$^a$ extend downward from the top of the endless conveyer 4 and deliver the grain from said endless conveyer to the conveyers 12 in the wings.

Each bin is provided with an imperforate inside door 29, hinged at the top, and an imperforate outside door 30, hinged at the side. Between these doors and in the wall of the structure, so as to fill the door-space, is an open-work frame or screen 29$^a$, composed of wire-netting, wires, perforated sheets, iron rods, wooden slats, or any similar arrangement. When the inside door 29 is swung down into closed position, the screen or open-work is tightly closed, so as to adapt the bin to the reception of small grain.

At the center of each of the wings and at the rear of the several bins is a passage-way 30$^a$, access to which is had by means of the doors at the ends of the wings and from the central portion 1 of the elevator-building.

At top of passage-way 30$^a$ a series of wires, iron rods, or perforated sheets or wood slats 24$^a$ are provided to allow air to pass from the passage-way upward to the cupolas 9 and 10 and at the same time provide a suitable ventilated support for the ear-corn. Doors or covers 30$^b$, hinged to central partition, are provided above the central passage-way 30$^a$ and adapted to be closed down over the screen-supports 24ª when the bins are used for the storage of small grain.

The bottoms 31 of the bins are inclined downward for the purpose of facilitating the feeding of the grain from the bins to the conveyers 19 and 20 when it is desired to transfer the grain out of the bins, and 32 designates slides for closing the openings in the lower portions of said bins. The bottom 31 is provided with an open-work ventilating support or screen 36, extending the length of the wing and similar to the perforated screens 29ª, and, like the parts 29ª, also provided with solid doors 37, like the doors 29, adapted to close the spaces in each bin for the purpose of tightly closing the bins and forming a support for small grain.

The end of each wing is provided with an outside door for the purpose of affording ventilation from end to end thereof.

The operation is as follows: Power is transmitted direct from a gas or steam engine (not shown) by belt to pulley 32ª on shaft 33. Lower longitudinal conveyers 19 and 20 are driven by right-hand quarter-twist belts 34. Upper longitudinal conveyers 12 are driven by left-hand twist-belts 35, which connect with pulleys on shaft 33. Vertical elevator 4 is driven direct by open belt 33ª. By this method all counter-shafts are dispensed with and all belting is done from one central line-shaft suspended by drop-hangers from the upper floor-joints. When the bins are to be filled, grain is conveyed from a wagon or other receptacle to the boot 5 through either main side entrance and then elevated by the main elevator 4 to the pipes 22ª and thence down said pipes onto the upper conveyer-belts 12 and by them carried along the troughs 16 and delivered to the several bins by the spouts 18. The particular bin to which the grain must be delivered is determined by closing or opening the required number of slides 18ª. When it is desired to unload the bins, it is only necessary to raise the slides 32, and the grain will fall out onto the lower conveyer-belts 19 and 20, from whence it is delivered to the chutes 23 and thence to the boot, from which it may be transferred to the wagon or other conveyance for the purpose of carrying it to any point desired.

I do not desire to limit myself to the precise form and construction of elevator-building shown, as it is obvious that many minor changes may be made in the ventilating features and other parts of the building without departing from the scope of my invention.

What I claim is—

1. An elevator-building comprising a main central portion, a vertical endless conveyer in said portion, wings on each side thereof, having a ventilating communication with said central portion, said wings provided with troughs having a series of openings, a series of bins corresponding to said openings, and horizontal endless conveyer-belts designed to travel along said troughs and deliver grain through said openings, and means to independently open and close said openings, substantially as described.

2. An elevator-building having a main central portion, a wing on each side of said central portion, a continuous passage-way extending through each of said wings from the central portion, a series of bins on each side of said passage-way and ventilating-partitions at the top of said passage-way and between said bins and ventilating-partitions in the sides of said bins, substantially as described.

3. An elevator-building having a main central portion, a vertical conveyer therein, a series of bins on each side of said central portion, a horizontal delivering-conveyer extending over said bins, means whereby grain may be delivered independently to each of said bins, a horizontal discharging-conveyer below said bins, means to afford an independent drive to said conveyers and means whereby the grain may be discharged independently from each of said bins, substantially as described.

4. An elevator-building comprising a main central portion having a conveyer, wings on each side less in height than said central portion and provided with troughs and endless conveyers, and a series of bins, means independent of the conveying means leading to the bins for conveying grain into said bins and means for delivering grain from said bins, substantially as described.

5. An elevator-building comprising a main central portion having a conveyer, wings on each side less in height than said central portion, and provided with inside and outside hinged doors.

6. An elevator-building comprising a main central portion having a conveyer, wings having a horizontal ventilating-partition, extending the length of the wings, substantially as described.

7. An elevator-building comprising a main central portion having an endless conveyer, wings on each side of said central portion, provided with a series of bins each having an inner door and an outer door, substantially as described.

8. An elevator-building comprising a main central portion having an endless conveyer, wings on each side of said main central portion, each provided with upper and lower conveyers, and a series of bins, each bin provided with a door-space and an open-work supporting-frame in said space, an inside door designed to cover said open-work frame when the bin is to be used for small grain, substantially as described.

9. An elevator-building comprising a main central portion provided with a vertical elevator, wings on each side of said central portion each provided with upper and lower horizontal conveyers, a series of bins having openings provided with slides for closing the said openings, a screen at the side of each of the bins, and an imperforate door for covering said screen, substantially as described.

10. An elevator-building provided with a series of bins having inner doors and outer doors, and a screen between them, substantially as described.

11. An elevator-building provided with a series of bins having slanting bottoms, inner doors and outer doors and a screen between them, said doors designed when closed to cover said screen, substantially as described.

12. An elevator-building provided with bins having outer doors, and inner doors, and a ventilating-frame of iron rods between the doors, substantially as described.

13. An elevator-building comprising a main central portion provided with a vertical endless conveyer, wings on each side of said central portion provided with bins and upper and lower conveyers, means for conveying grain from the vertical conveyer to the upper conveyers of the wings, and means for conveying grain to the lower conveyers of the said wings, substantially as described.

14. An elevator-building comprising a central portion having a vertical conveyer, wings on each side of said central portion having bins with slanting bottoms, and doors for each of said bins, upper and lower troughs in said wings having openings and slides for covering the same, each of said troughs provided with a conveyer, substantially as described.

15. An elevator-building comprising a central portion having a boot, a vertical conveyer extending from said boot, chutes at top of said elevator, wings at the side of said central portion having a series of bins provided with an upper conveyer designed to receive grain from said chutes, and lower conveyers designed to receive grain from said bins, substantially as described.

16. An elevator-building comprising a central portion having a conveyer, wings at the sides of said central portion each provided with a series of bins, upper and lower troughs, the upper troughs having openings and slides, and separate endless conveyers passing through said troughs designed to respectively deliver grain to and convey it from said bins, and means to drive said conveyers independently, substantially as described.

17. An elevator-building comprising a central portion having a vertical conveyer, wings at the sides of said central portion each provided with a series of bins, upper troughs with conveyers, said troughs having openings and troughs designed to deliver grain to said bins, lower troughs with conveyers independent of the upper conveyers whereby the upper and lower conveyers may be separately driven, and designed to receive grain from said bins, substantially as described.

18. An elevator-building provided with a continuous passage-way through the center thereof provided at the top with a perforated frame or screen and means for closing the same to adapt the building for the storage of small grain, substantially as described.

19. An elevator-building provided with a passage-way having a perforated frame or screen and doors for closing said frame or screen to adapt the building for the storage of small grain, substantially as described.

20. An elevator-building provided with perforated frames or screens in the wall or floor supports, in combination with interior imperforate closure means for covering the frame or screen spaces to adapt the building for the storage of small grain, substantially as described.

21. An elevator-building provided with a continuous passage-way provided at the top with a perforated frame or screen, and means for covering the same, and bins having perforated ventilating frames or screens in their sides and bottom and means for covering said frames or screens to adapt the building for the storage of small grain, substantially as described.

In testimony whereof I affix my signature in presence of two subscribing witnesses.

JAMES C. TOBIAS.

Witnesses:
 Jos. H. Blackwood,
 H. P. Doolittle.